US012571527B2

(12) United States Patent
Secretin

(10) Patent No.: US 12,571,527 B2
(45) Date of Patent: Mar. 10, 2026

(54) LUMINAIRE CONTROL DEVICE WITH INCREASED POWER AUTONOMY

(71) Applicant: Schreder S.A., Brussels (BE)

(72) Inventor: Laurent Secretin, Liege (BE)

(73) Assignee: Schreder S.A., Brussels (BE)

( * ) Notice: Subject to any disclaimer, the term of this patent is extended or adjusted under 35 U.S.C. 154(b) by 123 days.

(21) Appl. No.: 17/997,147

(22) PCT Filed: Apr. 30, 2021

(86) PCT No.: PCT/EP2021/061430
§ 371 (c)(1),
(2) Date: Oct. 26, 2022

(87) PCT Pub. No.: WO2021/219859
PCT Pub. Date: Nov. 4, 2021

(65) Prior Publication Data
US 2023/0160564 A1 May 25, 2023

(30) Foreign Application Priority Data

Apr. 30, 2020 (NL) ...................................... 2025472

(51) Int. Cl.
*F21V 23/00* (2015.01)
*F21S 9/02* (2006.01)
(Continued)

(52) U.S. Cl.
CPC .............. *F21V 23/003* (2013.01); *F21S 9/02* (2013.01); *F21V 23/0442* (2013.01);
(Continued)

(58) Field of Classification Search
CPC ...... F21V 23/003; F21V 23/0442; F21S 9/02; H02J 7/0068; H02J 9/065; H02J 7/0048; H02J 50/001; H05B 47/19
(Continued)

(56) References Cited

U.S. PATENT DOCUMENTS

| | | | |
|---|---|---|---|
| 8,100,552 B2 * | 1/2012 | Spero ..................... | H05B 45/20 |
| | | | 362/276 |
| 9,338,839 B2 * | 5/2016 | Recker ................... | H05B 45/38 |

(Continued)

FOREIGN PATENT DOCUMENTS

| | | |
|---|---|---|
| WO | 2017156180 A1 | 9/2017 |
| WO | 2019134899 A1 | 7/2019 |

OTHER PUBLICATIONS

PCT International Search Report and Written Opinion, Application No. PCT/EP2021/061430, mailed Jun. 14, 2021, 16 pages.
(Continued)

*Primary Examiner* — Ryan Jager
(74) *Attorney, Agent, or Firm* — McDonnell Boehnen Hulbert & Berghoff LLP

(57) ABSTRACT

Example embodiments relate to luminaire control devices with increased power autonomy. One embodiment includes a luminaire control device for a luminaire that includes a light source and a functional circuitry for performing at least one task. The luminaire control device includes a power input connectable to a power source. The luminaire control device also includes an energy storage element. Further, the luminaire control device includes a power control circuitry. The power control circuitry is connected to the power input and to the energy storage element. The power control circuitry is also connectable to the functional circuitry. The power control if further configured to control the supply of power from the power input and/or from the energy storage element to the functional circuitry, in an operational condition where both power from the power input and power from the energy storage element are available.

20 Claims, 9 Drawing Sheets

(51) Int. Cl.

| | |
|---|---|
| *F21V 23/04* | (2006.01) |
| *H02J 7/00* | (2006.01) |
| *H02J 9/06* | (2006.01) |
| *H05B 47/19* | (2020.01) |

(52) U.S. Cl.

CPC ............ *H02J 7/0068* (2013.01); *H02J 9/065* (2013.01); *H05B 47/19* (2020.01)

(58) Field of Classification Search

USPC .......................................................... 315/307

See application file for complete search history.

(56) References Cited

U.S. PATENT DOCUMENTS

| | | | | |
|---|---|---|---|---|
| 10,660,179 B1 * | 5/2020 | Hsia | .......................... | H02J 7/007 |
| 10,697,616 B2 * | 6/2020 | Vang | ...................... | F21V 21/005 |
| 11,041,608 B2 * | 6/2021 | Vang | .......................... | F21V 5/02 |
| 11,271,422 B2 * | 3/2022 | Hsia | ....................... | H02J 7/0047 |
| 11,480,324 B2 * | 10/2022 | Secretin | ................... | F21V 23/06 |
| 2012/0235579 A1 * | 9/2012 | Chemel | ................... | F21V 29/60 |
| | | | | 315/152 |
| 2013/0342131 A1 * | 12/2013 | Recker | ................... | H05B 45/00 |
| | | | | 315/297 |
| 2017/0279300 A1 * | 9/2017 | Catalano | ............ | H05B 45/3725 |
| 2020/0344863 A1 * | 10/2020 | Etorre | ................. | H05B 47/175 |
| 2022/0034496 A1 * | 2/2022 | Secretin | ................. | H05B 47/18 |
| 2023/0160564 A1 * | 5/2023 | Secretin | .............. | F21V 23/0442 |
| | | | | 315/307 |

OTHER PUBLICATIONS

"Luminaire Extension Module & Receptacle", Zhaga Interface Specification, Book 18, Edition 1.0, Jul. 2018, 40 pages.

Cimcon Software India: "LightingGale—Remotely Monitor and Control Street Lights", Jan. 1, 2009, pp. 1-2, XP055201539, Retrieved from the Internet: URL:http://www.cimconautomation.com/power/street_light_cm.htm [retrieved on Jul. 24, 2015] the whole document.

\* cited by examiner

LUMINAIRE CONTROL DEVICE WITH INCREASED POWER AUTONOMY

CROSS-REFERENCE TO RELATED APPLICATIONS

The present application is a national stage entry of PCT/EP2021/061430 filed Apr. 30, 2021, which claims priority to NL 2025472 filed Apr. 30, 2020, the contents of each of which are hereby incorporated by reference.

FIELD OF INVENTION

The present invention relates to luminaire control devices for a luminaire comprising a light source and a functional circuitry, and in particular for an outdoor luminaire.

BACKGROUND

Outdoor luminaires are provided with a light source, nowadays often a LED light source. Typically a luminaire also comprises a driver for driving said light source. Each luminaire may further be provided with a luminaire control device, often interfacing with the driver. Typically, luminaire control devices are used for monitoring and/or controlling the driver. They may be connected to and may additionally be in charge of sensors and/or communication interfaces with the outside world. Each luminaire control device may be provided with a short-range communication device for connecting the luminaire to a local network of luminaires and/or a long-range communication device for connection to a remote server. Via the communication device, the luminaire can be further controlled.

A luminaire control device often derives its electrical power from the luminaire to which it is connected. This architecture imposes hence some limitations in terms of power available for the luminaire control device and therefore imposes limitations on the operation of said luminaire control device. Among the possible tasks to be performed by the luminaire control device, the power demands may vary. For instance, short-range communications demand relatively low power while long-range communications and other functions, like measurement by sensors, may require more power. Multi-tasking several of these tasks may require even more power.

There is therefore a need for a luminaire control device able to control power needed for performing tasks in an improved manner.

SUMMARY

The object of the invention is to provide a luminaire control device with increased power autonomy.

According to a first aspect of the invention, a luminaire control device is provided for a luminaire comprising a light source and a functional circuitry for performing at least one task. The luminaire control device comprises a power input connectable to a power source, an energy storage element, and a power control circuitry. The power control circuitry is connected to the power input, to the energy storage element and to the functional circuitry. The power control circuitry is configured to control the supply of power from the power input and/or from the energy storage element to the functional circuitry, in an operational condition where both power from the power input and power from the energy storage element are available.

In this way, the luminaire control device can distribute the power supply to the functional circuitry from two sources (the power input and the energy storage element) either alternatively or in a complementary additive way, such that the power circuitry can power the functional circuitry in an improved manner. The available maximum power of the luminaire control device is increased and hence the functionalities of the functional circuitry may be expanded. In particular the maximum available power of the luminaire control device may be increased above the maximum available power at the power input. In particular the extra power may be used to implement more functions or new function(s) with higher power demands than the limited power received from the power source. In other words the luminaire control device enjoys an increased power autonomy with respect to the limited power at its power input. Also, for luminaire control devices receiving power directly derived from the grid, i.e. where the grid functions as power source, a similar architecture with an energy storage element could be envisaged to also further increase the power autonomy.

It is noted that the power on the power input may be limited to a maximum available power either due to intrinsic limitations on the power source side and/or may be limited by norms defining power limitations on the power inputs for different categories of functional circuitries. Concerning the intrinsic limitations of the power source, the power coming from the power source may be limited due to its physical implementation or due to the electrical dimensioning of other electrical components on the power source side like connectors or wires. Optionally, the power control circuitry may comprise a power limiter configured to limit the power drawn from the power source at the power input, e.g. to meet a power limitation requirement.

It is noted that the term luminaire may refer to a luminaire head or a luminaire module with a housing in which a light source is included. Preferred embodiments relate to a luminaire head or module of an outdoor luminaire By outdoor luminaire, it is meant luminaires which are installed on roads, tunnels, industrial plants, campuses, stadiums, airports, harbours, rail stations, parks, cycle paths, pedestrian paths or in pedestrian zones, for example, and which can be used notably for the lighting of an outdoor area, such as roads and residential areas in the public domain, private parking areas, access roads to private building infrastructures, etc.

It is further noted that the invention is not limited to luminaire control devices with a control function necessarily interacting with the luminaire but the invention can be envisaged in broader terms as a control device associated with a luminaire in general. The interaction between the control function of the control device and the luminaire itself is optional. The control function may be the controlling of a device located on or in the luminaire or a device external to or at a distance of the luminaire. It can be envisaged to use the control device of the invention on a luminaire without any communication or further impact on the lighting or sensing functions of the luminaire.

The luminaire could then be merely a convenient support for the control device. For example, the control device could be connected to a pollutant sensor located on the luminaire or at a distance of the luminaire, the sensor forming a network of sensors e.g. collocated with a network of luminaires and managed by another operator than the operator of the luminaires.

In a preferred embodiment, the power control circuitry may be configured to control the supply of power to the functional circuitry based on at least one criterion selected from criteria including the one or more tasks that need to be performed by the functional circuitry, and the level of energy available in the energy storage element. In this manner, an improved use of the available power may be obtained. In particular the criterion of the task to be performed enables to use the extra power in the energy storage element only when needed. The criterion of the level of energy available in the energy storage element enables to manage the energy in the energy storage element. Alternatively the two criteria may be combined using predetermined priorities attributed to the one or more tasks and to the energy level in the energy storage element. In this way, it may be possible to use the available power in an improved manner for the operation of one or more functional circuitries of the luminaire. Alternatively other criteria may be envisaged based on circumstances.

In a preferred embodiment, the power control circuitry may be configured to use at least power from the energy storage element to provide power to the functional circuitry. In this way the functional circuitry may be powered more autonomously from the power input as the energy storage element operates as a power buffer. Alternatively, the power control circuitry may be configured to use at least the input power to provide power to the functional circuitry. In this way charging of the energy storage element may be prioritized.

In a preferred embodiment, the power input has a maximum available power, i.e. the power input is connected so as to receive a maximum available power. As explained above, this may be either due to intrinsic limitations on the power source side and/or may be limited by norms defining power limitations on the power inputs for different categories of functional circuitries. The power control circuitry is configured to provide the functional circuitry with a power which is higher than the maximum available power of the power input by using power from the energy storage element. In this way, the power control circuitry may extend the power usage.

In a preferred embodiment, the power control circuitry may be configured to use power from the energy storage element to provide additional power to the functional circuitry on top of the power received from the power input. In this way the dimensioning of the energy storage element may be optimized. Alternatively the energy storage may be dimensioned to provide all the power needed for performing the at least one task of the functional circuitry.

In a preferred embodiment, the power control circuitry is configured to provide the additional power to the functional circuitry to implement one or more functions having higher power demands than a maximum available power of the power input. In this way, the functional circuitry may be versatile.

In a preferred embodiment, the power control circuitry may be further configured to control the charging of the energy storage element from the power input. In this manner the energy level in the energy storage element may be replenished and regulated, to insure for instance the autonomy of certain tasks.

In a preferred embodiment, the power control circuitry may be configured to charge the energy storage element with power received at the power input when the power at the power input is not entirely consumed by the functional circuitry. In this manner all the energy received from the power input is used efficiently to improve the power autonomy of the luminaire control device. Charging by default the energy storage element whenever possible contributes to optimizing the dimensioning of the energy storage element.

In a preferred embodiment, the power control circuitry may be further configured to control the supply of power provided to the functional circuitry by scheduling in time said power provided to the functional circuitry. In particular the supply of power may be over time postponed, anticipated, interrupted, activated or disabled. More in particular any of the one or more tasks of the functional circuitry or the charging of the energy storage element may be scheduled in time. Alternatively the control of supply of power to the functional circuitry may follow an iterative process in time without upfront scheduling. It is noted that the intelligent part of the power control circuitry, for example a microcontroller, may actually be located anywhere in the luminaire and does not have to be collocated with the electrical part of the power control circuitry. Also, the power control circuitry may be distributed across the luminaire in various portions of hardware and/or software.

In a preferred embodiment, a sensor may be provided for measuring an energy level of the energy storage element and the power control circuitry may be further configured to control the supply of power based on the measured energy level. In this manner an efficient control of the power may be realized based on real-time information of the energy level in the energy storage element, and optionally also based on other data such as power demand, energy price, etc. In particular, the power control circuitry may be configured to charge the energy storage element when the measured energy level is below a predetermined threshold. In this way, a minimum charge of the energy storage element is ensured to perform vital functions. More in particular the predetermined threshold may be such that one last task of the functional circuitry can still be performed in a condition where power from the power input is being cut. In this way enough energy for e.g. a last safety communication is ensured. Alternatively or additionally the predetermined threshold may be such that another vital function is ensured, for instance local storage of information or restart capabilities.

Further details about performing a last task can be found in patent application WO 2021/013925 A1 in the name of the applicant, which is included herein by reference.

According to a further aspect, a luminaire control assembly is provided comprising a luminaire control device according to any of the above described preferred embodiments and the functional circuitry connected to this luminaire control device. The luminaire control assembly may be grouped in a module or may be provided in a distributed way in the luminaire. When grouped in a module, the functional circuitry and its related control device may be included in a convenient manner in/to the luminaire, e.g. as a pluggable module plugged in a receptacle of the luminaire housing, or as a module which can be included in the luminaire housing. Preferably, the module has a module housing and the functional circuitry and its related control device may be included in the module housing.

In a preferred embodiment, the functional circuitry may be configured to perform at least one task among monitoring/controlling the driver, communicating preferably in a wireless manner, sensing, or controlling/monitoring a component internal or external to the luminaire In this way any function whether directed towards the driver or towards the outside, with a high or low power demand may be accommodated. For example, in case of a sensor being mounted on the luminaire, the functional circuitry could perform the function of monitoring/controlling the sensor.

More generally any kind of functional circuitry may be included in the luminaire such as:

- telecommunication and/or networking circuitry for wired and/or wireless communication, which can comprise at least one of: an optical fiber connection, a fiber to copper interface, a fiber patch panel, a modem, a router, a switch, a patch panel, a network video recorder (NVR), an emitter, a receiver, a transceiver, a computer;
- audio system management circuitry which can comprise at least one of: an amplifier, a transformer, a media player (connected to network or not), electrical connections for multiple loudspeaker lines, a computer;
- WiFi circuitry, wherein an antenna for receiving WiFi signals may be integrated either in the module housing or in a separate antenna module connected to the module housing;
- a human interface device (HID) and the associated circuitry, e.g. a camera, a loudspeaker, a button, a display, etc.
- a signaling device, e.g. a light ring capable of performing signaling;
- a clock, an astroclock;
- a computing means;
- an electrical plug-in device,
- a projector,
- a fumigation and/or vaporization system,
- a UV system,
- an autonomous vehicle guiding system.

In a preferred embodiment, the functional circuitry may comprise at least one sensor, preferably a sensor sensing environmental data. Examples of a sensor which may be included are a pollutant sensor, a motion sensor, a humidity sensor, a light sensor, a temperature sensor, a visibility sensor, an image/video sensor, a radar sensor, a sound sensor, a voice recorder, a microphone, a detector of $CO_2$, NOx, smoke, a virus detection sensor, an infrared sensor, a thermal sensor for human body temperature, etc. In this manner, a sensor with a power demand larger than the power received from the power source may be accommodated in the luminaire control device. Other sensors known in the art and requiring large power may be envisaged, in particular sensors operating in a discontinuous manner to provide intermittently sensing information. In between sensing moments, the energy storage element may then be charged.

In a preferred embodiment, the functional circuitry may comprise a communication interface, and the power control circuitry may be configured to supply the communication interface with power from at least the energy storage element for transmitting data via the communication interface. In this way, a communication interface may be supplied with power independently from the power received from the power source. In particular an additional communications function may be powered from the energy storage element, on top of the standard controlling/monitoring function powered from the power input. In particular the communication interface may be a cellular communication interface. Alternatively other communication interfaces requiring more power than the power received from the power source alone may receive power from at least the energy storage element.

In a preferred embodiment, the functional circuitry may comprise a first communication interface and a second communication interface. The power control circuitry may be configured to supply the first communication interface with power from at least the energy storage element. The power control circuitry may be configured to supply the second communication interface with only power from the power source or with power from at least the energy storage element. In this way, multiple communication interfaces with various power demands may be supplied with power in an improved manner, e.g. independently from the power received from the power source. In particular an additional communication interface may be powered on top of a standard communication interface. More in particular, the first communication interface may be a long-range communication interface, such as a cellular communication interface, and the second communication interface may be a short-range communication interface. Alternatively the communication interfaces may be of the same nature.

Preferably, the luminaire control assembly further comprises a data interface connected to the functional circuitry and configured for exchanging data between the functional circuitry and at least one other component of the luminaire, preferably a driver for driving the light source. The data interface may be configured for outputting control data by the functional circuitry, e.g. dimming data.

According to another aspect there is provided a pluggable module comprising a luminaire control device according to any one of the above described embodiment or a luminaire control assembly according to any one of the above described embodiments.

In a preferred embodiment, the pluggable module has external contacts for electrically connecting the luminaire control device to a receptacle electrically connected to the power source and optionally also to one or more other components of the luminaire. For example, the external contacts may comprise both power supply contacts and data contacts. In this manner the module may be standardized to be compatible with many different luminaires. More in particular, the pluggable module may be conforming the Zhaga Interface Specification Standard as defined in Book 18, Edition 1.0, July 2018 or Book 20: Smart interface between indoor luminaires and sensing/communication modules, which are included herein by reference. Alternatively other interfaces like a NEMA interfaces can be envisaged.

According to an exemplary embodiment, the socket receptacle and pluggable control module may be implemented as described in PCT publication WO2017/133793 in the name of the applicant, which is included herein by reference. Optionally, the socket receptacle and pluggable control module may be configured and/or mounted as described in patent application PCT/EP2020/068854 or PCT/EP2020/060751 in the name of the applicant, which are included herein by reference.

According to another aspect, a luminaire is provided comprising a light source, a functional circuitry for performing at least one task, a power source, and a luminaire control device according to any one of the previous embodiments. According to yet another aspect, a luminaire is provided comprising a light source, a power source, and a pluggable module according to any one of the previous embodiments.

The power source may comprise converter circuitry configured to convert grid power into a power signal at the power input of less than 10 W. The power source may be any one of the following or a combination thereof: an auxiliary power supply, a DALI bus power supply, a power source configured to feed an Ethernet cable, a solar array, a thermal or vibration energy harvesting device.

Typically the luminaire further comprises a driver for driving the light source. The power source may be provided as a separate component or as an integral auxiliary power source of the driver. In the latter embodiment, the driver comprises driver circuitry configured for converting a grid power into a light source power signal suitable for driving the light source, and converter circuitry for converting the grid power into an auxiliary power signal of the auxiliary power source. These converter circuitries are typically unidirectional. Thus the driver has a power input receiving power from the grid and two power outputs: a first power output for driving the light source and a second power output intended for being connected to the power input of the luminaire control device. The second power output is preferably not used as a power input, i.e. preferably the main light source is only fed with power from the grid and is not fed with energy from the energy storage element.

The power source may be connected via a power bus or a power and data bus to the power input. The power bus may receive for instance 24V, 3 W from an auxiliary power supply and/or 56 mA from a DALI Bus power supply. Optionally, the bus may power one or more further luminaire control devices, and optionally also other components of the luminaire.

In a preferred embodiment, the luminaire comprises a housing in which the light source is arranged. Optionally, a driver for driving a luminaire component such as the light source is also arranged in the luminaire housing. The luminaire housing may be provided with a receptacle, and a module according to the previous embodiments may be arranged outside the luminaire housing with external contacts of the module plugged in the receptacle. Alternatively, the luminaire control device and/or the functional circuitry may be arranged inside the luminaire housing.

BRIEF DESCRIPTION OF THE FIGURES

This and other aspects of the present invention will now be described in more detail, with reference to the appended drawings showing currently preferred embodiments of the invention. Like numbers refer to like features throughout the drawings

DESCRIPTION OF THE EMBODIMENTS

Whilst the principles of the invention have been set out above in connection with specific embodiments, it is understood that this description is merely made by way of example and not as a limitation of the scope of protection which is determined by the appended claims. Same numbers will be used in different figures to refer to similar elements.

Figure 1:
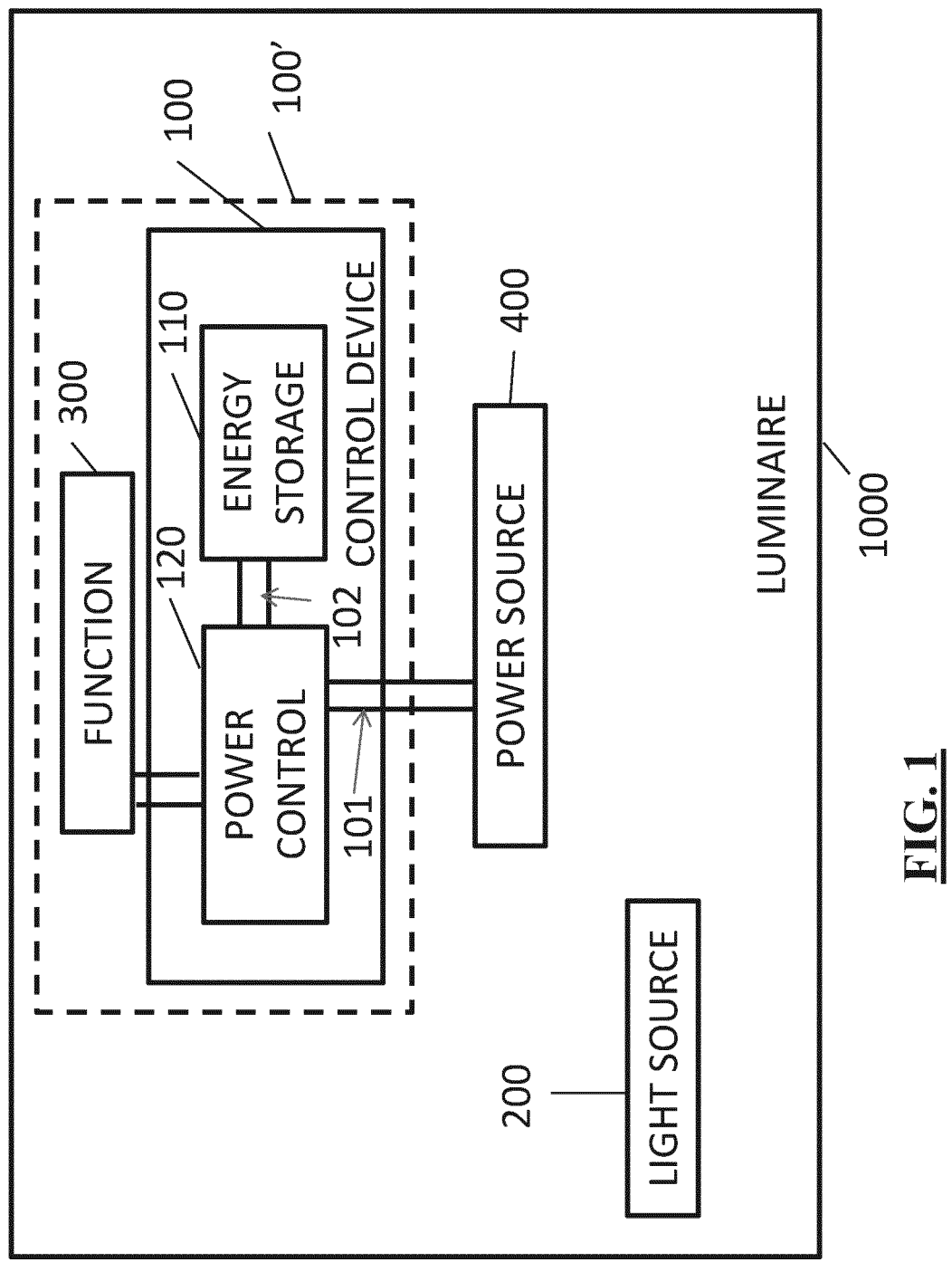
FIG. 1 illustrates a schematic diagram of an exemplary embodiment of a luminaire with a luminaire control device.

FIG. 1 shows a first embodiment of the present invention. FIG. 1 shows a luminaire 1000 comprising a light source 200, a power source 400, a luminaire control device 100 and functional circuitry 300. Optionally the power source 400 may be part of a driver (not shown) for driving the light source 200. Optionally the functional circuitry 300 and the luminaire control device may be included in single module 100' as indicated in dashed lines in FIG. 1. From the point of view of the power source 400, the luminaire control device 100 may be purely a load consuming power from the power source 400.

The luminaire control device 100 is connected to the functional circuitry 300 and provided with a power control circuitry 120 and an energy storage element 110. The functional circuitry 300 is configured to perform at least one task. Among the tasks that may be envisaged for the functional circuitry are monitoring/controlling a driver using a driver control circuitry, communications preferably in a wireless manner using a communication interface and sensing environmental variables using a sensor.

The luminaire control device 100 comprises a power input 101 for receiving power from the power source 400. For example, the power source 400 may be an auxiliary power supply, optionally an auxiliary power supply provided in the driver which also includes driver circuitry for driving the light source 200. For example, the driver comprises driver circuitry configured for converting a grid power into a light source power signal suitable for driving the light source, and converter circuitry for converting the grid power into an auxiliary power signal of the auxiliary power source 400. These converter circuitries are typically unidirectional. Thus the driver has a power input receiving power from the grid and two power outputs: a first power output for driving the light source 200 and a second power output intended for being connected to the power input 101 of the luminaire control device 100. The second power output is preferably not used as a power input, i.e. preferably the main light source 200 is only fed with power from the grid and is not fed with energy from the energy storage element 110.

In another example, the power source 400 may be a DALI bus power supply. The power source 400 may be connected to the power input 101 of the power control circuitry 120 via an internal power bus connected to the driver circuitry as well as to the DALI bus power supply and the auxiliary power supply.

The power source 400 typically derives its power from the grid via power converters, preferably unidirectional power converters not specified here but known to a person skilled in the art. Such converters are present for example typically in a driver having its own auxiliary power supply, or in a 56 mA DALI bus power supply or in a 24V, 3 W auxiliary power supply. Alternatively the power source 400 may be an autonomous power source, like a solar array or a power harvesting source using vibrations or thermal energy, or the grid itself. The power source 400 may generate auxiliary power not suited for powering the light source 200. In particular the power source 400 may deliver up to a maximum available power, substantially below the power needed for driving the light source 200.

The power source 400 may deliver a limited amount of power up to a maximum available power (3 W, 24V for instance for the example auxiliary power source cited above) to the power input 101, either due to its own characteristics (e.g. the dimensions of the converter circuitry of the power source) or due to others electrical components, like connectors and wires between the power source 400 and the power input 101. The power on the power input 101 may also be limited by a standard. Typically functional circuitries 300 are classified into categories with power norms defining a maximum power that can be present on their power inputs. For example, a certain category of functional circuitries may not have more than 2 W on its power input. To meet the power limitation from the luminaire control device side, a power limiter may be integrated in the luminaire control device 100 to ensure that the power drawn at the power input 101 is always under the predefined maximum power of the standard to be met.

Typically the functional circuit 300 may comprise a driver control circuitry comprising at least dimming control circuitry, e.g. circuitry for performing 1-10V or 0-10V dimming or for performing DALI dimming Although not represented in FIG. 1 a data connection for exchanging data between the driver and the luminaire control device 100 may be present. In such an example, dimming data from the driver control circuitry is sent via a data connection of the luminaire control device 100 to the driver. Optionally a real time clock functionality may be included in order to use time dependent dimming profiles. Based on circumstances other tasks may be performed by the functional circuitry.

The functional circuitry 300 may comprise for example any one or more of the following communication circuitry: cellular communication circuitry, ENOCEAN control circuitry, Bluetooth Low Energy (BLE) control circuitry, Zig-Bee control circuitry, NFC (Near Field Communication) control circuitry, Low-Power Wide-Area Network (LP-WAN) circuitry such as LoRa, Sigfox, Narrow-Band Internet of Things (NB-IoT), Low-Rate Wireless Personal Area Network (LR-WPAN) circuitry e.g. as defined in IEEE.802.15.4, LwM2M protocol circuitry, Constrained Application (CoAP) protocol circuitry, wi-SUN protocol circuitry and any other known communication protocol circuitry.

The functional circuitry 300 may also comprise other circuitry such as: Li-Fi control circuitry, digital signal processing circuitry, firmware update handling circuitry, sensor control circuitry, a PCB with one or more light sources. The sensor control circuitry may be any one of the following: a pollutant/air quality sensor, a humidity sensor, a light sensor circuitry, a temperature sensor, a visibility sensor, a detector of $CO2$, $NOx$, smoke, an IR camera daylight sensing circuitry, a motion sensor, a video/image processing circuitry, a sound sensor circuitry (a voice recorder, a microphone), a virus detection sensor, a thermal sensor for human body temperature.

The power control circuitry 120 receives power or energy from the power source 400 through a power input 101, and provides in turn power to the functional circuitry 300 consuming power. Further the power control circuitry 120 is connected with the energy storage element 110 for supplying and receiving energy thereto/therefrom. It is here noted that in the description the terms power or energy may be used indifferently. Typically, the power control circuitry 120 is connected via a power bus to the power source 400, and receives for instance 24V, 3 W from an auxiliary power supply and/or 56 mA from a DALI Bus power supply.

The power control circuitry 120 may control the power supplied to one or more elements inside the luminaire control device 100 and to one or more elements connected to the luminaire control device 100, such as the functional circuitry 300. In particular it controls the power supply from the power input 101 and the energy storage element 110 to the functional circuitry 300. Further, it may control the charging of the energy storage element 110 with power received through the power input 101. Once charged, the energy storage element 110 becomes an internal additional source of energy connected to the power control circuitry 120 such that the energy from the energy storage element 110 may also be supplied to the functional circuitry 300. As energy storage element 110, a battery, a capacitor or any other known means for storing electrical energy may be provided. In practical examples, reference may be made to a battery as the energy storage element. Yet these examples should not be read as a limitation to that specific way of implementing the energy storage element. Any means for storing energy are encompassed. It is noted that, in addition or alternatively, the energy storage element 110 may be charged by another means, e.g. a solar cell or energy harvesting means from for instance heat dissipation and/or vibrations.

The power control circuitry 120 is configured for controlling the power supply to the functional circuitry 300, in a condition where both power from the power input 101 and power from the energy storage element 110 is available. By controlling the power supply is meant enabling and/or disabling said power supply whether in real time or in a scheduled manner In a scheduled manner the power control may be interrupted, advanced, postponed or cancelled. In addition the power supply may be regulated in any known way, using voltage, current or power regulation techniques and/or circuits.

In an embodiment, depending on the task to be performed by the functional circuitry 300, the power demand of the functional circuitry 300 may be different, such that the functional circuitry may have to be powered from the power input 101 and/or from the energy storage element 110. In particular the energy in the energy storage element may be used to provide additional power to the functional circuitry 300 on top of the power received from the power input 101. A plurality of criteria may be related to the task to be performed such as:

when and/or how often the task needs to be performed,
    how much power is needed to perform the task,
    how long the task lasts,
    what relative priority the task may have compared to other tasks or to the charging of the energy storage element, etc.

A plurality of scenarios of control based on the task to be performed can be envisaged, such as for example:

For performing a communication with a local network using short-range communication or for performing the controlling and/or monitoring of the driver, the functional circuitry 300 may be powered solely by the power source 400. Typically the power source 400, e.g. an auxiliary power source of a driver, delivers indeed directly sufficient power to perform short-range communication or control/monitoring.

For performing a communication with a remote server using cellular communication, the functional circuitry 300 may be powered from both the power source 400 and the energy storage element 110.

Further, depending on the level of energy in the energy storage element 110, the supply of power to the functional circuitry 300 may be controlled. A plurality of criteria may be related to the level of energy in the storage element 110 such as:

whether the level is above or below a certain threshold associated with a specific task, whether the level is above or below a minimum predetermined threshold required for a last gasp communication, how much power is available, etc.

Also, both the task to be performed and the level of energy may be used to control the supply of power to the functional circuitry 300. Predetermined priorities may be attributed to the one or more tasks and to the energy level, to schedule in time the tasks and the charging. For instance some tasks may be interrupted, advanced, postponed or cancelled to prioritize charging, or prioritize other tasks. For instance, short range communications may be interrupted temporarily to charge the energy storage element 110 in prevision of a scheduled cellular communication.

A sensor may further be provided for measuring the energy level of the energy storage element 110 and the power control circuitry 120 may be further configured to control the supply of power based on the measured energy level. Such a sensor for measuring the state of charge of e.g. a battery is known to a skilled person. In particular, the power control circuitry 120 may be configured to charge the energy storage element 110 when the measured energy level is below a predetermined threshold. The minimum charge of the energy storage element 110 may be used to perform vital functions. More in particular the predetermined threshold may be such that one last communication can still be sent in a condition where power from the power input 101 is being cut. The power control circuitry 120 may for example interrupt a task if the level of energy in the energy storage element 110 falls under the predetermined level for a last gasp of cellular communication with a remote server.

The power control circuitry 120 may be configured to charge the energy storage element 110 with power received at the power input 101 when the power at the power input 101 is not entirely consumed by the functional circuitry 300. The energy storage element 110 may be advantageously charged by default in the absence of a task to be performed by the functional circuitry 300. In this manner all the energy received from the power source is used efficiently to improve the power autonomy of the luminaire control device. The power limitation on the power input 101 is in this way circumvented.

Figure 2:
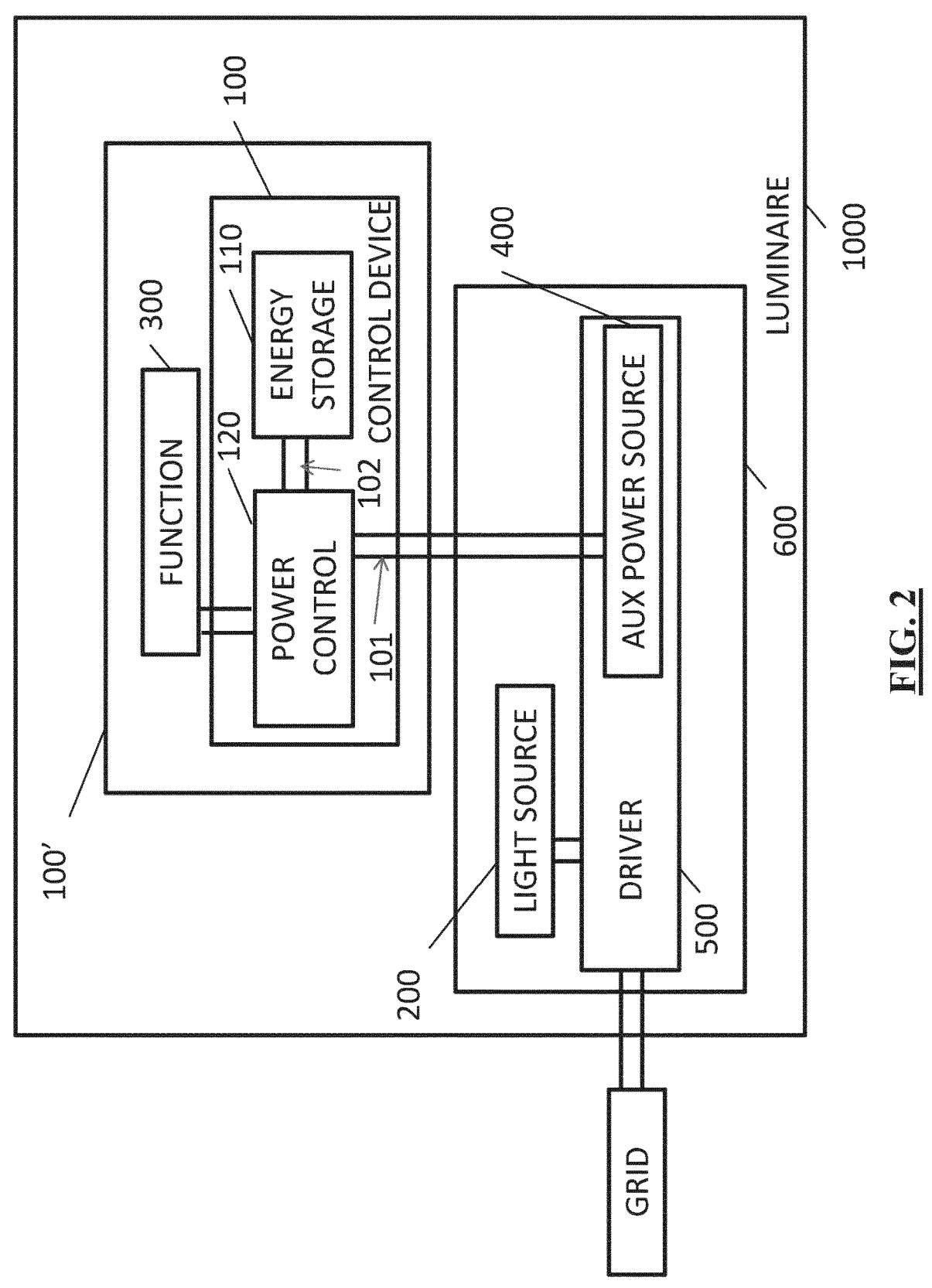
FIG. 2 illustrates schematically a diagram of an exemplary embodiment of a luminaire with a luminaire control device, where the luminaire control device is implemented as a module containing the functional circuitry.

FIG. 2 shows an embodiment of a luminaire 1000 comprising a luminaire housing 600 comprising a light source 200 and a driver 500 for driving the light source 200, and a module 100', preferably a pluggable module, comprising the luminaire control device 100 and the functional circuitry 300. As in FIG. 1, from the point of view of the power source 400, the luminaire control device may be purely a load consuming power from the power source 400.

The driver 500 is connected to the grid and is configured to convert the grid power into a suitable current or voltage for driving the light source 200. The module 100' is arranged outside the housing 600 of the luminaire. In this example the power source 400 is an auxiliary power source of the driver 500. For example, the driver 500 comprises driver circuitry configured for converting a grid power into a light source power signal suitable for driving the light source, and additional converter circuitry for converting the grid power into an auxiliary power signal output by the auxiliary power source 400. These converter circuitries are typically unidirectional. Thus the driver has a power input receiving power from the grid (or from another suitable power source) and two power outputs: a first power output for driving the light source 200 and a second power output intended for being connected to the power input 101 of the luminaire control device 100. The second power output is preferably not used as a power input, i.e. preferably the main light source 200 is only fed with power from the grid and is not fed with energy from the energy storage element 110. The power source 400 may derive auxiliary power not suited for powering the light source 200. In particular the power source 400 may deliver up to a maximum available power, substantially below the power needed for driving the light source 200.

The features described above for FIG. 1 may also be implemented in the embodiment of FIG. 2. Although the driver 500 is shown to be located in the housing 600, it will be understood that the driver may be arranged also on or near the housing 600 or in another part of the luminaire such as a pole of the luminaire.

Figure 3:
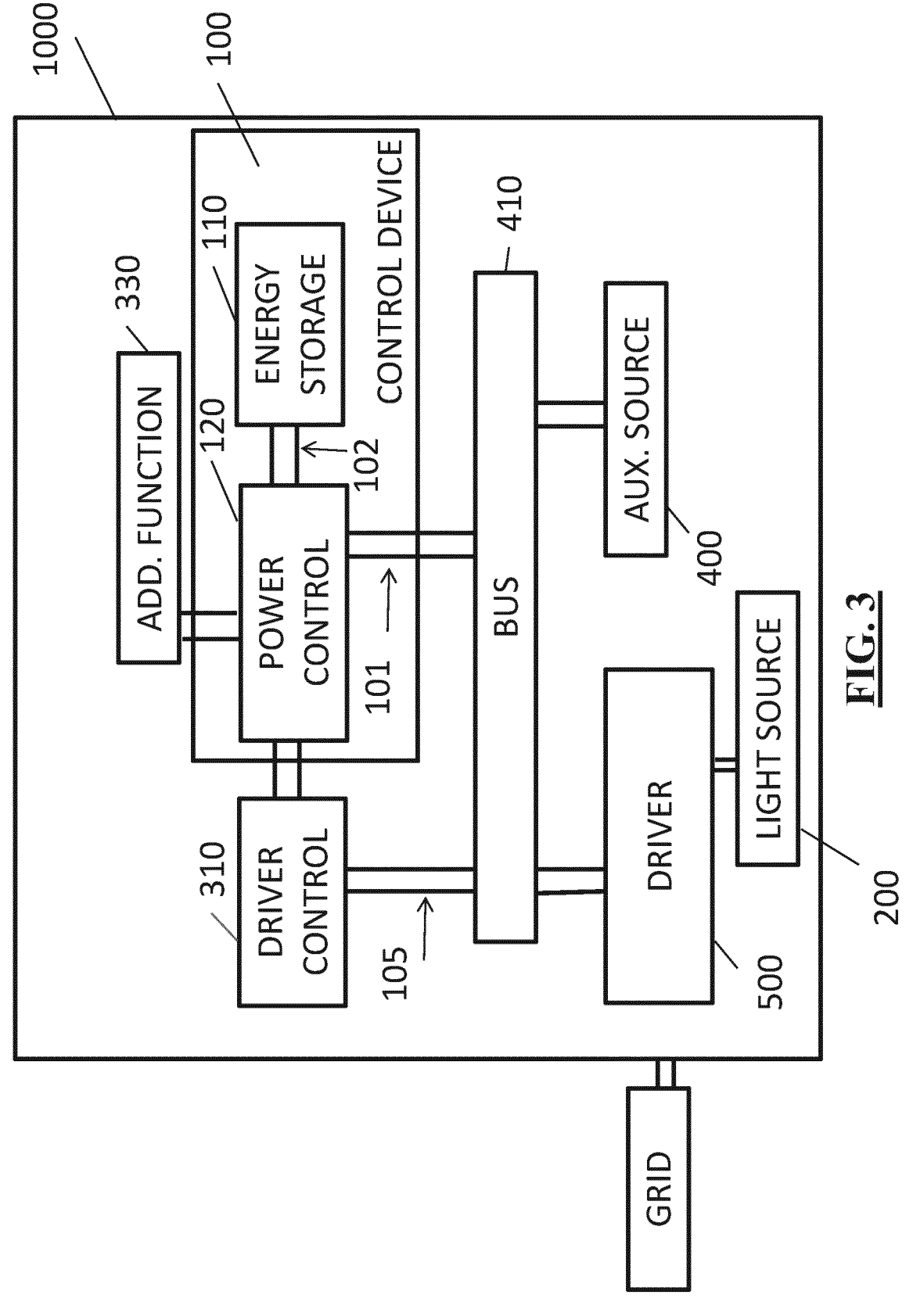
FIG. 3 illustrates a schematic diagram of a luminaire comprising an exemplary embodiment of a luminaire control device connected, as functional circuitry, to a driver control circuitry and an additional functional circuitry.

FIG. 3 shows an embodiment of a luminaire 1000 comprising a light source 200, an auxiliary source 400, a driver 500 for driving the light source 200, a luminaire control device 100 and functional circuitry comprising a driver control circuitry 310 for monitoring and/or controlling the driver 500 and an additional functional circuitry 330, typically a wireless communication circuitry, separate from each other. The luminaire control device 100 is connected to the driver control circuitry 310 and the additional functional circuitry 330. From the point of view of the power source 400, the luminaire control device may be purely a load consuming power. The luminaire control device 120 controls the power supply from the power input 101 and the energy storage element 110 to the driver control circuitry 310 and to the additional functional circuitry 330. Further, it may control the charging of the energy storage element 110 with power received through the power input 101. The operation of the power control circuitry 120 of FIG. 3 may be in essence the same as the operation of the power control circuitry 120 described for FIG. 1, such that explanations on the control operation will not be repeated. The skilled person will further understand that the example of FIG. 3 is a mere example and that multiple modifications can be made without affecting the overall operation of the luminaire control device.

A data interface 105 is provided between the driver control circuitry 310 and the driver 500. The data interface may be configured for outputting control data by the driver control circuitry 310, e.g. dimming data, to the driver 500, and/or for transmitting data from the driver 500 to the functional circuitry 300. Although no connection lines are shown in FIG. 3, it will be understood that the driver 500 receives power from the grid and converts the received power in a suitable current or voltage for driving the light source 200.

The luminaire of FIG. 3 further comprises a power source 400 connected to a bus 410 which is connected to the power input 101 of the luminaire control device 100. The power source 400 also receives power from the grid (although no connection lines are shown in FIG. 3) and converts the grid power in a power signal suitable for feeding certain functional circuitries. The power source 400 may derive auxiliary power not suited for powering the light source 200. In particular the power source 400 may deliver up to a maximum available power, substantially below the power needed for driving the light source 200. The driver 500 may also be connected to the bus 410 to exchange data like dimming data with the driver control 310 via the bus 410. The bus 410 may be a power bus or a power and data bus as known in the art. The bus 410 may be e.g. a DALI bus, but could be any kind of suitable bus capable of transporting power such as a power over Ethernet (PoE) bus. The latter may be useful for indoor luminaire systems. The power supply 400 may be e.g. an auxiliary power supply, for instance 24V, 3 W, e.g. deriving its power directly from the grid. The bus 410 may also be used to power other devices such as a movement sensor communicating with the driver 500. The power bus 410 may also be connected to other power sources, such as a DALI Bus power supply (not shown). Other power architectures inside the luminaire may however be envisaged and multiple modifications can be made regarding the power source without affecting the overall operation of the luminaire control device receiving its power. As already explained, the power source 400 is typically a power source derived from the grid with intrinsic power limitations related to the luminaire application able to deliver up to a maximum available power and optionally the luminaire control device 100 may comprise a power limiter for limiting the power at the power input 101 in order to meet a certain standard.

It is noted that multiple power sources may be connected to the bus 410. For example, when multiple devices requiring different power signals are connected to the bus, also different suitable power sources may be connected to the bus. Optionally, the power control circuitry 120 may receive power from multiple power sources instead of from one power source 400, but this is generally not preferred.

Further, any features described above for FIG. 1 may also be implemented in the embodiment of FIG. 3.

Figure 4:
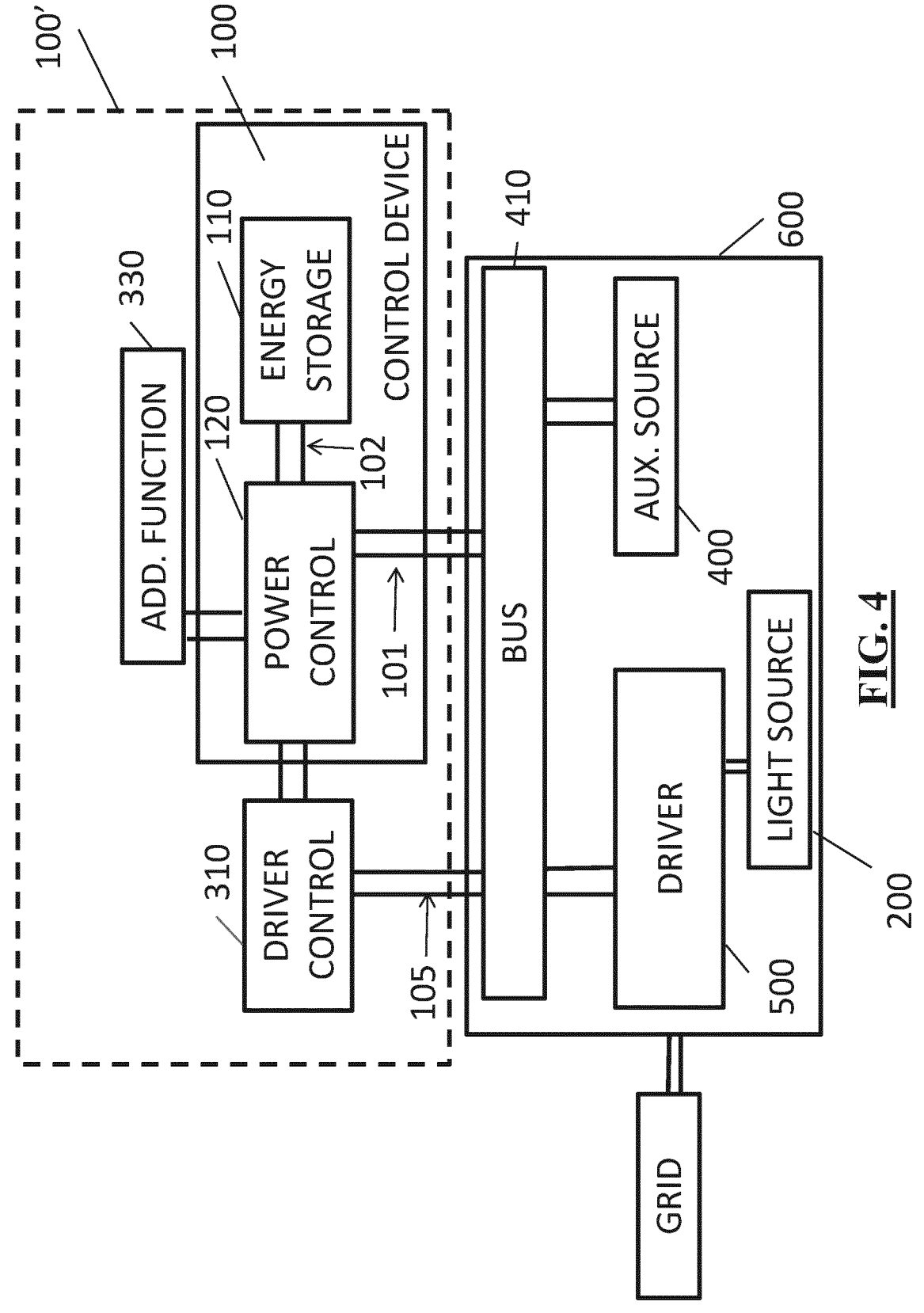
FIG. 4 illustrates schematically a diagram of a luminaire where the luminaire control device according to an exemplary embodiment is located inside a module together with the driver control circuitry and an additional functional circuitry.

FIG. 4 shows an embodiment similar to the embodiment of FIG. 3 where the luminaire control device 100 is located inside a module 100', preferably a pluggable module 100', together with the driver control circuitry 310 and an additional functional circuitry 330. The module 100' is located outside of a housing 600 of the luminaire comprising the light source 200, the driver 500, the power source 400, and the bus 410. In an alternative embodiment, the module 100' may be included in the luminaire housing.

A data interface 105 is provided between the module 100' and the driver 500. The data interface may be configured for outputting control data by the driver control circuitry 310, e g dimming data, to the driver 500, and/or for transmitting data from the driver to the module 100'. It is noted that further data lines may be provided between the module 100' and one or more other components of the luminaire.

Figure 5:
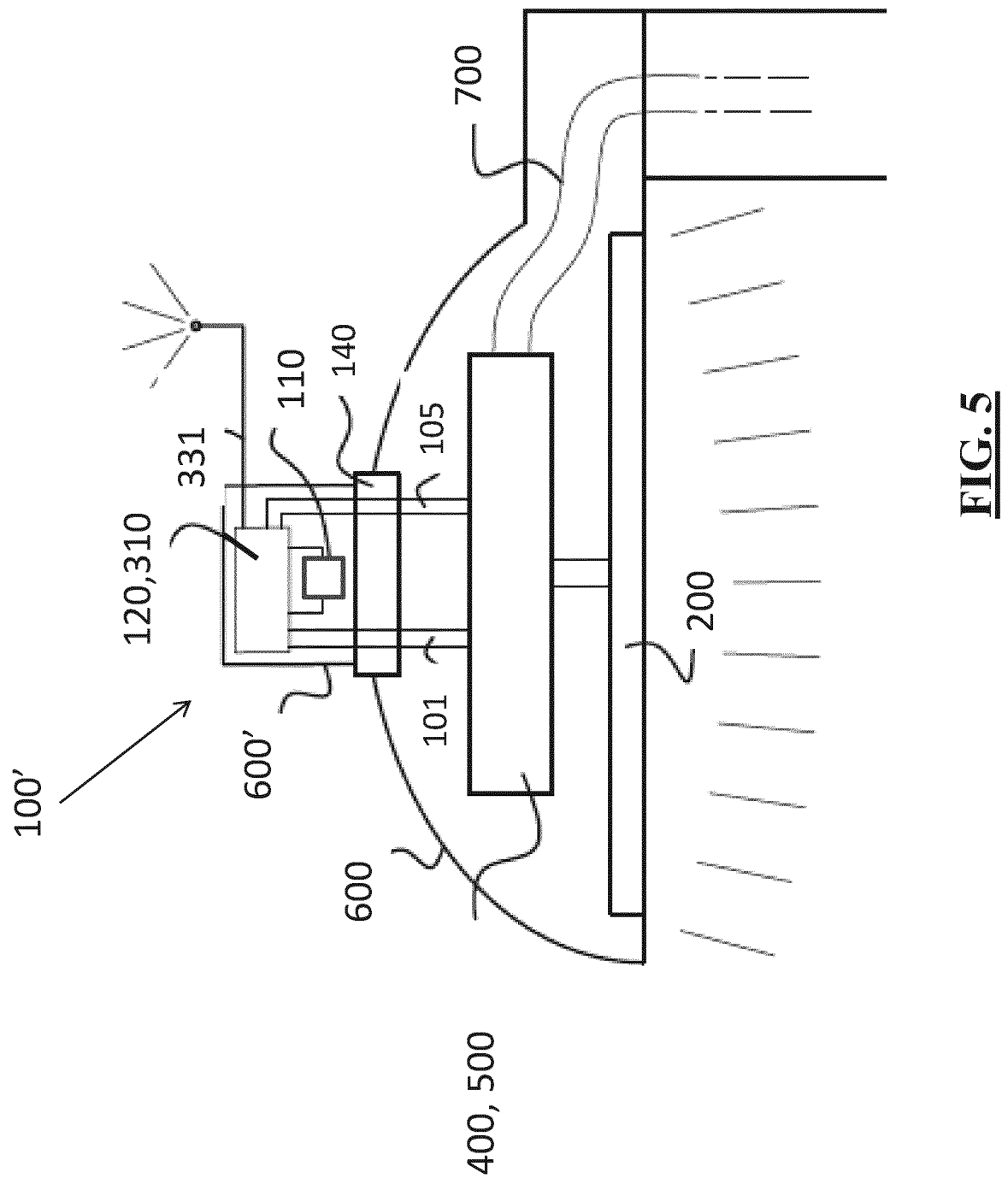
FIG. 5 illustrates a schematic drawing of an exemplary embodiment of luminaire with a luminaire control device with a long-range communication interface.

FIG. 5 shows an embodiment of a luminaire control device comprising an energy storage element 110 and a power control circuitry 120 connected to a communication interface 331 as an additional functional circuitry, and to a driver control circuitry 310 (for simplicity reasons 120 and 310 are shown as one block but 120 and 310 may be implemented as separate functional blocks). FIG. 5 also shows an embodiment where the luminaire control device 110, 120 and a driver control circuitry 310 are located in a separate pluggable module 100' located outside of a housing 600 of a luminaire In FIG. 5, the luminaire takes the form of a luminaire head connected to a pole. However, the luminaire may also be connected to another type of support or may be a pole module configured to be inserted into a modular pole comprising a plurality of pole modules arranged one above the other. The housing 600 encloses a driver 500, a light source 200 and a power source 400 which may optionally be part of the driver 500. A receptacle 140 connected to the power source 400 is provided at the exterior of the housing 600 for receiving the pluggable module 100'. The pluggable module 100' comprises external contacts serving as power and data interfaces which may be arranged as a plug. The internal contacts in the receptacle 140 serving as power and data interfaces with power source 400 and a data lines may then be arranged as socket. The power input 101 and the data interface 105 are connected to the external contacts of the pluggable module 100' such that power from the power source 400 is supplied to the power control circuitry 120 and such that data, e.g. dimming data can be supplied by the driver control circuitry 310 to the driver 500.

The receptacle 140 may comprise an electrical interface to feed a low voltage power supply, typically a 24V DC signal. Such a receptacle or socket may fulfil the requirements of the Zhaga Interface Specification Standard (Book 18, Edition 1.0, July 2018, see https://www.zhagastandard.org/data/downloadables/1/0/8/1/book18.pdf or Book 20: Smart interface between indoor luminaires and sensing/communication modules).

The energy storage element 110 may be enclosed inside a housing of the module 100' which facilitates maintenance as the module 100' may be unplugged and easily replaced. When the energy storage element 110 is formed as a battery, the battery may be replaced periodically, for example once every five years.

The functional circuitry 331 of FIG. 5 is a long-range communication interface, in particular a cellular communication interface for receiving and sending information to a cellular network. The functional circuitry 331 may require more power than the power received at the power input 101 and may receive power supply from the energy storage element 110, either exclusively or on top of the power received at the power input 101. The power control circuitry 120 controls the distribution of energy between the sources, that is the power input 101 and the energy storage element 110, and the loads, that is the additional functional circuitry 331 and the driver control circuitry 310. The power control circuitry 120 may also control the charging of the energy storage element 110, such that the energy storage element 110 may be regarded as both a source and a load depending on circumstances.

The operation of the power control circuitry 120 of FIG. 5 is in essence the same as the operation of the power control circuitry 120 described for FIG. 1, such that explanations on the control operation will not be repeated. The skilled person will further understand that the example of FIG. 5 is a mere example and that multiple modifications can be made without affecting the overall operation of the luminaire control device. The transmission of energy and/or signals through the external contacts 140 can be formed physically, being a wired connection, or optical or electromagnetic connection, for example via coils. The driver control circuitry 310 may be optional or may be located outside of the housing 600' of the pluggable module 100'. Additional sensors may be added inside or outside of the housing 600' of the module 100'. Although the energy storage element 110 is shown to be located in the housing 600' of the pluggable module 100', alternatively the energy storage element 110 may be removably disposed on the exterior of the housing 600' of the pluggable module 100' as a pluggable unit. Although the cellular communication interface 331 is shown to be located outside of the housing 600' of the pluggable module 100', alternatively the cellular communication interface may be disposed inside the housing of the pluggable module 100'.

Figure 9:
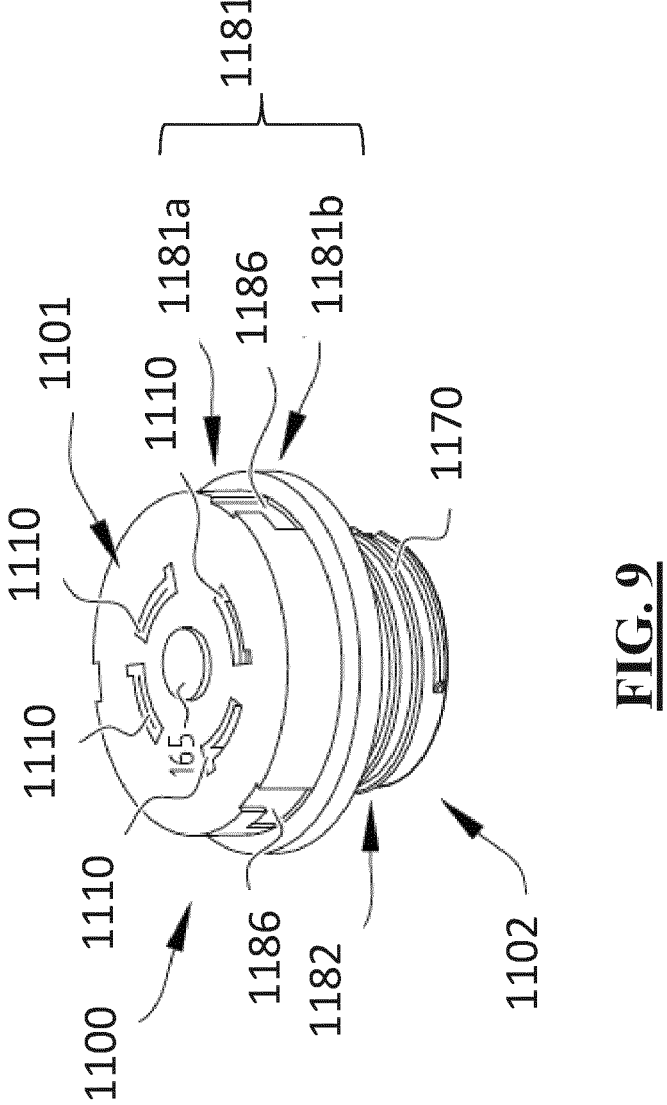
FIG. 9 illustrates an example of a Zhaga receptacle for use with exemplary embodiments of the luminaire control device.

FIG. 9 shows an example of such a receptacle 1100 according to the Zhaga standard. Such receptacles 1100 are typically mounted in an opening in the housing of the luminaire, e.g. in a top wall or in a bottom wall of the housing, and are electrically connected to various components of the luminaire. The receptacle 1100 has a connection interface located at an external side of the housing, so that an external module, e.g. the pluggable module 100' of any one of the embodiments described above, can be plugged into the receptacle 1100 to provide control and/or communication and/or other functionalities for the luminaire. An external module typically comprises at least three standard prongs or plug contacts which are inserted into corresponding apertures 1110 in the receptacle 1100.

The receptacle 1100 has a front side 1101 and a rear side 1102. The receptacle 1100 may be in accordance with the Zhaga standard (see LEX-R in book 18, Edition 1.0, July 2018). The front side 1101 is configured for receiving electrical contacts of an external module (not shown) of a luminaire. The external module may also be in accordance with the Zhaga standard (see LEX-M in book 18, Edition 1.0, July 2018). The rear side 1102 is intended for being electrically connected to components of the luminaire, such as a LED driver, a controller, a sensor, a metering device, etc. The receptacle 1100 houses a plurality of receptacle contacts 1110 (shown in a schematic manner in FIG. 9) in apertures arranged in the front side 1101. Each receptacle contact 1110 is provided, at a front end, with a front contact portion configured for being electrically connected with a contact of the external module. The front contact portions of the plurality of receptacle contacts 1110 extend near the front side 1101 of the receptacle 1100. The plurality of receptacle contacts 1110 extends substantially along a first cylindrical surface around a central axis of the receptacle. The front side 1101 of the receptacle 1100 may be provided with a central recess 1165 configured for receiving a central pin of the external module, preferably in accordance with the above mentioned Zhaga standard. Optionally, the receptacle 1100 comprises an RFID tag (not shown in FIG. 9), preferably at the front side 1101 of the receptacle 1100. Also other components may be included in the receptacle 1100, such as wireless communication means, sensor means, an antenna, protection circuitry, etc.

The receptacle 1100 has a housing comprising a substantially cylindrical front portion 1181 at the front side 1101 of the receptacle 1100, and a rear portion 1182 protruding rearward at a rear side of the cylindrical front portion 1181. The rear portion 1182 is provided at the rear side thereof with a screw-thread 1170. The receptacle socket assembly may further comprise a nut (not shown in FIG. 9) configured to be screwed on the screw-thread 1170. The substantially cylindrical front portion 1181 may comprise a first substantially cylindrical front portion 1181*a* having a first diameter and a second substantially cylindrical front portion 1181*b* having a second diameter which is larger than the first diameter. A peripheral surface of the first substantially cylindrical front portion 1181*a* may be provided with recesses 1186 adapted to cooperate with notches of the external module in order to lock an external module in the receptacle 1100.

Preferably, the plurality of receptacle contacts 1110 comprises: at least one receptacle contact for carrying power signals, and/or at least one receptacle contact for carrying data or control signals, and/or at least one receptacle contacts for carrying a power signal and a data or control signal. For example, a first contact 1110 may be a DC power supply (e.g. 24 V), a second contact 1110 may be a positive pole for a dimming protocol (e.g. DALI), a third contact 1110 may be a general digital I/O (e.g. greater than 7 V), and a fourth contact 1110 may be at the same time a negative pole for the dimming protocol, a ground for the power supply, a ground for the general digital I/O.

Figure 6:
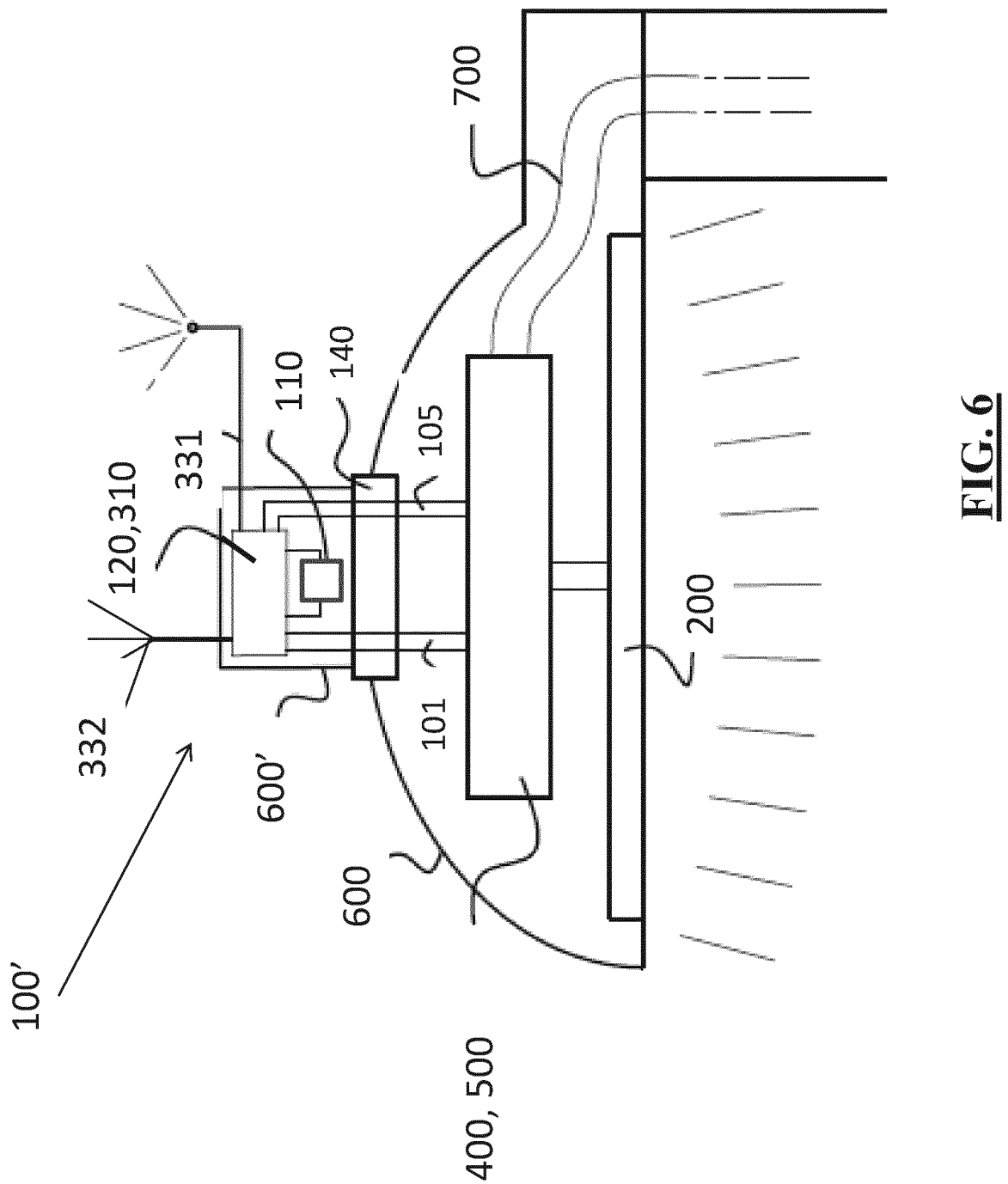
FIG. 6 illustrates schematically a drawing of another exemplary embodiment of a luminaire with a luminaire control device with a long-range communication interface and a short-range communication interface.

FIG. 6 shows an alternative embodiment of a luminaire control device comprising an energy storage element 110 and a power control circuitry 120 connected to a driver control circuit 310, a first communication interface 331 for cellular communication and to a second communication interface 332 for short-range communications. By using both communication interfaces 331, 332, the luminaire control device is able to communicate with other luminaire control devices in the local network and additionally communicate with a remote server. Via the network, luminaires in an outdoor lighting system can be controlled by a central management system. The central management system allows further an operator to set controls for the luminaires.

In similar manner as described for the embodiment of FIG. 1, the power control circuit 120 is configured to control the power supply to the communication interfaces from the power input 101 and/or the energy storage element 110. The first communication interface 331 being a cellular one requires more power than the second communication interface, requiring less power than received from the power source 400, such that the power control circuitry 120 is configured to supply power to the first communication interface 331, either exclusively from the energy storage module or together with power from the power input 101. The supply of power to the second communication interface 332 may be exclusively from the power input 101. Additionally, the driver control circuit 310 may also receive power from the power input 101.

The operation of the power control circuitry 120 of FIG. 6 is in essence the same as the operation of the power control circuitry 120 described for FIG. 1, such that explanations on the control operation will not be repeated. The skilled person will further understand that the example of FIG. 6 is a mere example and that multiple modifications can be made without affecting the overall operation of the luminaire control device. The transmission of energy and/or signals through the external contacts 140 can be formed physically, being a wired connection, or optical or electromagnetic connection, for example via coils. The driver control circuitry 110 may be optional or may be located outside of the housing 600' of the pluggable module 100'. Additional sensors may be added inside or outside of the luminaire control device. Although the energy storage element is shown to be located in the housing 600' of the module 100', alternatively the energy storage element 110 may be removably disposed on the exterior of the housing 600' as a pluggable unit. Although the communication interfaces 331 and 332 are shown to be located outside of the housing 600' of the pluggable module 100', alternatively one or both of the communication interfaces may be disposed inside the housing 600' of the pluggable module 100' like in the embodiments of FIGS. 2 and 4.

Figure 7:
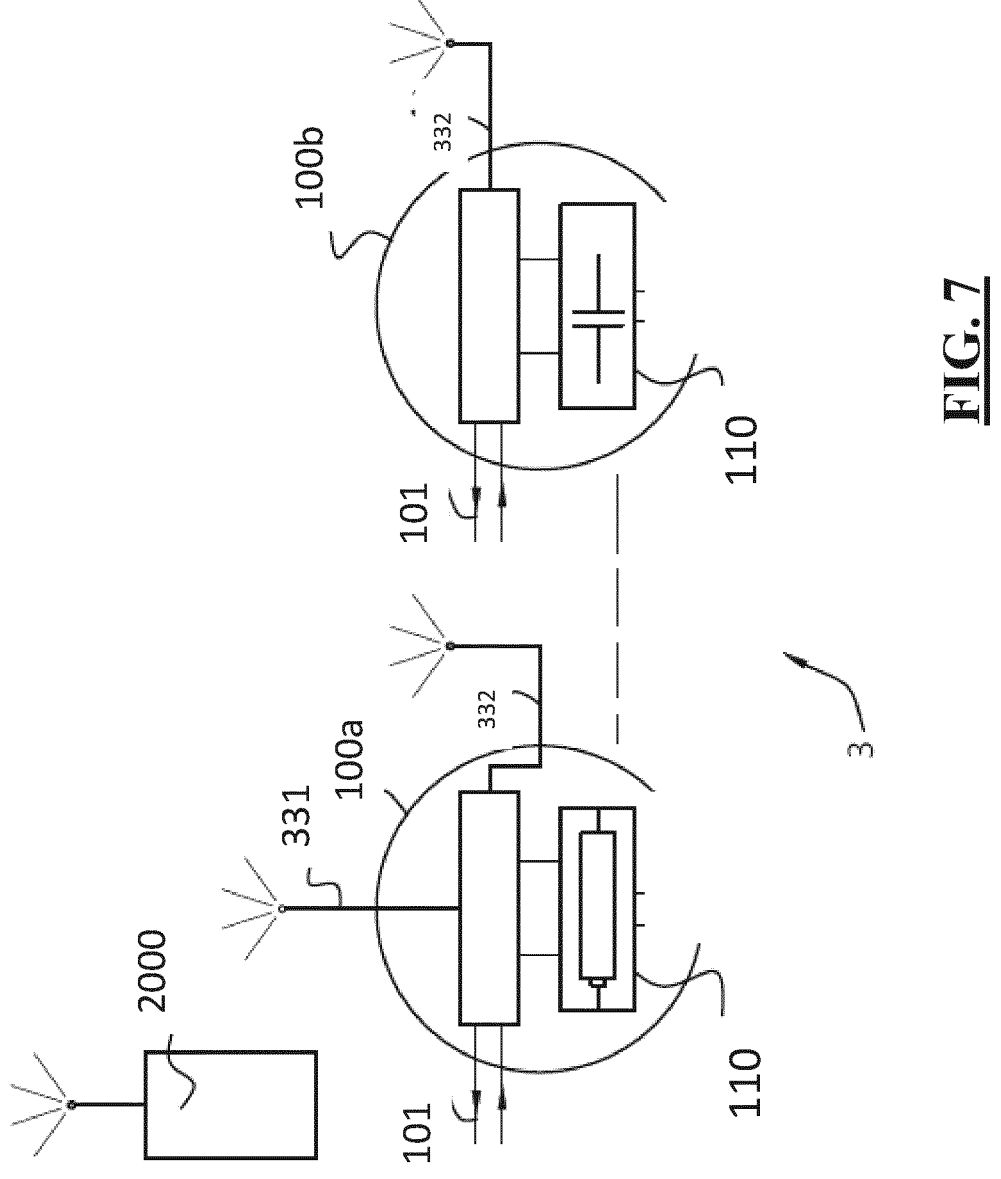
FIG. 7 illustrates schematically a system comprising a plurality of luminaire control devices.

FIG. 7 illustrates a system comprising a plurality of luminaire control devices 100*a*, 100*b* according to the invention, communicating together by short-range communication. Although only one luminaire control device 100*b* is shown, typically a plurality of luminaire control devices 100*b* will be present in a local network architecture including also one or more luminaire control devices 100*a*. Among the network of such luminaire control devices 100*a*, 100*b* etc., at least one luminaire control device 100*a* may also have a long-range communication interface device 331 to communicate with a remote server 2000. Each luminaire control device 100*a*, 100*b* may operate as described in the embodiments according to the previous figures.

Each luminaire control device 100*a*, 100*b* may be provided with an energy storage element 110. The energy storage element 110 may be formed as a battery, for example a Li-Ion, Ni—Cd or any other type of battery. Alternatively, the energy storage element 110 may be formed by a gold capacitor or an electrolytic capacitor or by any other known energy storage element.

For example, a luminaire control device 100 comprising both a long-range communication interface device 131 and a short-range communication interface 132 may be provided with a battery dimensioned to support the long-range communication while a luminaire control device 100*b* comprising only a short-range communication interface may be provided with a capacitor dimensioned to support only a limited amount of functions e.g. when the energy supply by the grid is interrupted. In this way, the type of energy storage element and the dimensioning of the energy storage element may be adapted in an efficient manner In particular, a driver delivering less power than the task that needs to be performed may still be used by dimensioning the energy storage element to compensate the power limitations of said driver.

Figure 8:
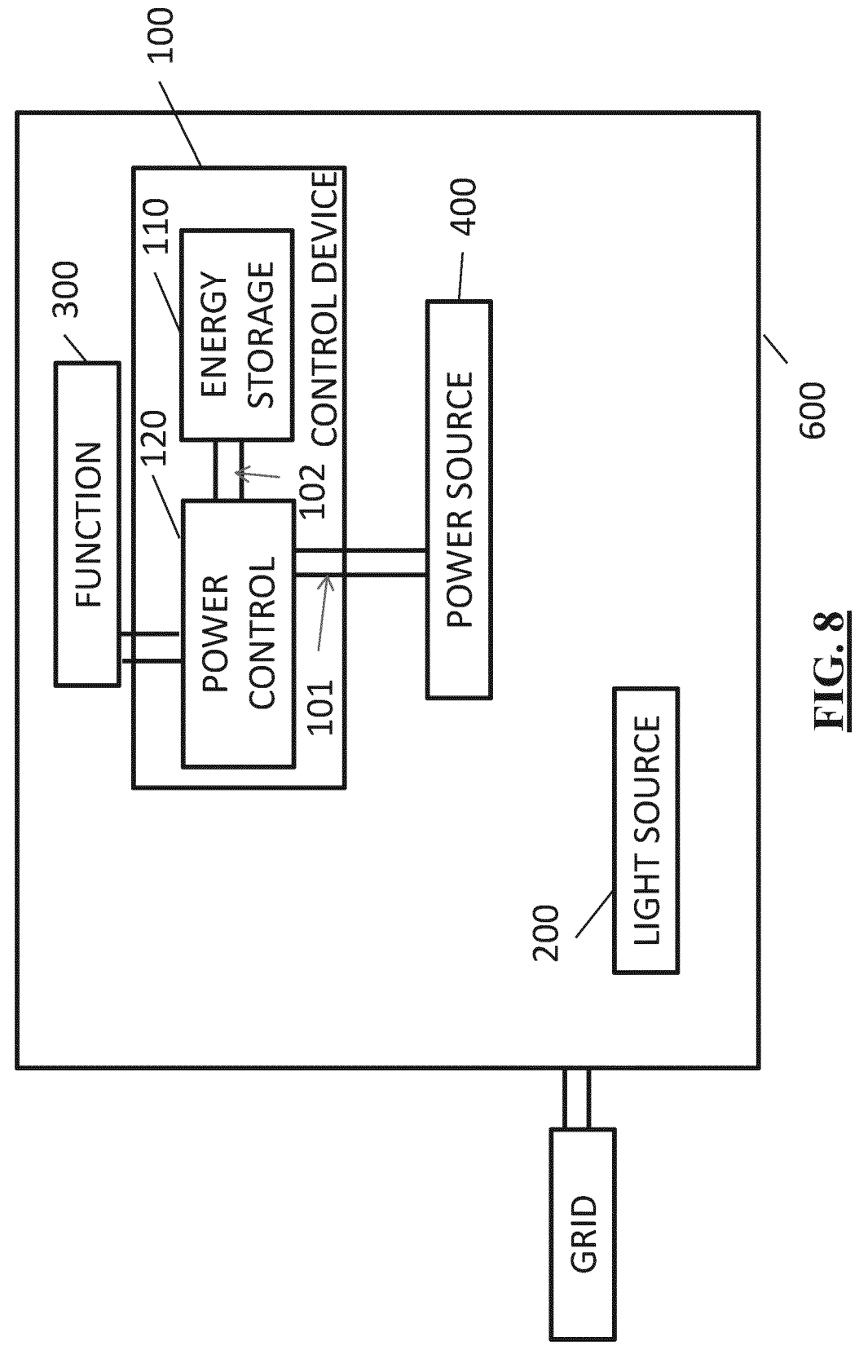
FIG. 8 illustrates a schematic diagram of a luminaire where the luminaire control device according to an exemplary embodiment is located inside the luminaire housing together with the light source.

FIG. 8 shows an embodiment of a luminaire with a luminaire housing 600 where the light source 200 and the luminaire control device 100 are located inside the housing 600 of the luminaire. Also the functional circuitry 300 and the power source 400 are shown to be located in the housing 600. Optionally, the power source 400 may be part of a driver (not shown) for driving the light source 200. This alternative offers the same advantages in terms of power autonomy as already presented in the previous embodiments.

Whilst the principles of the invention have been set out above in connection with specific embodiments, it is to be understood that this description is merely made by way of example and not as a limitation of the scope of protection which is determined by the appended claims.

The invention claimed is:

1. A luminaire control device comprising:
    a power input configured to connect to a power source, wherein the power source supplies power that is less than the power needed for driving a light source of a luminaire;
    an energy storage element; and
    a power control circuitry,
    wherein the power control circuitry is connected to the power input to receive power therefrom,
    wherein the power control circuitry is connected to the energy storage element to supply power thereto and receive power therefrom,
    wherein the power control circuitry is configured to connect to functional circuitry of the luminaire to provide power thereto,
    wherein the functional circuitry of the luminaire is configured to perform a task having a higher power demand than the power supplied by the power source,
    wherein the power control circuitry is configured to, in response to the higher power demand for the functional circuitry to perform the task, cause power to be simultaneously supplied from both the power input and the energy storage element to the functional circuitry of the luminaire to satisfy the higher power demand, and
    wherein the power control circuitry is configured to control charging of the energy storage element from the power input.

2. The luminaire control device of claim 1, wherein the power control circuitry is configured to control the supply of power to the functional circuitry based on at least one criterion selected from criteria including one or more tasks to be performed by the functional circuitry and the level of energy available in the energy storage element.

3. The luminaire control device of claim 1, wherein the power control circuitry is further configured to, in response to a lower power demand for the functional circuitry to perform a lower power task, cause power to be supplied from the energy storage element to the functional circuitry without causing power to be supplied simultaneously from the power input to the functional circuitry.

4. The luminaire control device of claim 1, wherein the power control circuitry is further configured to:
    charge the energy storage element with power received at the power input when the power at the power input is not entirely consumed by the functional circuitry; or
    control the supply of power provided to the functional circuitry by scheduling in time said power supplied to the functional circuitry.

5. The luminaire control device of claim 1, further comprising
    a sensor for measuring an energy level of the energy storage element, wherein the power control circuitry is further configured to control the supply of power based on the measured energy level.

6. The luminaire control device of claim 5, wherein the power control circuitry is further configured to charge the energy storage element when the measured energy level is below a predetermined threshold.

7. The luminaire control device of claim 6, wherein the predetermined threshold is such that one last task of the functional circuitry can still be performed by the luminaire control device in a condition where power from the power input is being cut.

8. The luminaire control device of claim 1, wherein the power control circuitry comprises a power limiter configured to limit the power drawn from the power source at the power input.

9. A luminaire control assembly comprising the luminaire control device according to claim 1 and the functional circuitry connected to said luminaire control device,
    wherein preferably the functional circuitry is configured to perform at least one task among monitoring/controlling a driver for driving a luminaire component, in particular for driving the light source, communicating preferably in a wireless manner, sensing, or controlling/monitoring a component.

10. The luminaire control assembly of claim 9, wherein the functional circuitry comprises:
    a communication interface, wherein the power control circuitry is configured to supply the communication interface with power from at least the energy storage element for transmitting data via the communication interface, and wherein preferably the communication interface is a cellular communication interface; or
    a first communication interface and a second communication interface, wherein the power control circuitry is configured to supply the first communication interface with power from at least the energy storage element, and wherein preferably the first communication interface is a long-range communication interface, such as a cellular communication interface, and the second communication interface is a short-range communication interface; or at least one sensor, wherein the at least one sensor comprises a pollution sensor, a motion sensor, a humidity sensor, a light sensor, a temperature sensor, a visibility sensor, an image/video sensor, a radar sensor, a sound sensor, a voice recorder, a microphone, a detector of $CO_2$, a detector of NOx, a smoke detector, a virus detection sensor, an infrared sensor, or a thermal sensor for human body temperature.

11. A pluggable module comprising the luminaire control assembly of claim 9.

12. The pluggable module of the claim 11, wherein the pluggable module is provided with external contacts for electrically connecting the luminaire control device to a receptacle electrically connected to the power source.

13. A luminaire comprising the light source and the luminaire control assembly according to claim 9.

14. A pluggable module comprising the luminaire control device of claim 1.

15. The pluggable module of claim 14, wherein the pluggable module is provided with external contacts for electrically connecting the luminaire control device to a receptacle electrically connected to the power source, and wherein more preferably the pluggable module conforms to the Zhaga Interface Specification Standard as defined in Book 18, Edition 1.0, July 2018.

16. A luminaire comprising the light source and the pluggable module according to claim 14.

17. A luminaire comprising the light source and the luminaire control device according to claim 1, comprising preferably at least one of:

(i) the power source connected to the power input, wherein more preferably the power source comprises at least one of: a converter circuitry configured to convert grid power into a power signal at the power input of less than 10 W; an auxiliary power supply; a DALI Bus power supply; a power source configured to provide power to an Ethernet cable; a solar array; or a thermal or vibration energy harvesting device;

(ii) a bus for connecting the power source to the power input of the luminaire control device;

(iii) a driver configured for driving the light source, wherein the driver comprises driver circuitry configured for converting grid power into a light source power signal suitable for driving the light source, and wherein preferably the driver comprises converter circuitry for converting the grid power into an auxiliary power signal of the auxiliary power supply; or (iv) a housing, wherein the light source is arranged in the housing, wherein preferably the housing is provided with a receptacle, wherein a pluggable module is arranged outside the housing and plugged in the receptacle, and wherein preferably the luminaire control device and/or the functional circuitry are arranged inside the housing.

18. The luminaire control device of claim 1, further comprising a data interface connected to the functional circuitry and configured for exchanging data between the functional circuitry and at least one other component of the luminaire, preferably a driver for driving the light source.

19. A luminaire comprising a light source;

a luminaire control device comprising:

a power input configured to connect to a power source, wherein the power source supplies power that is less than the power needed for driving the light source;

an energy storage element; and a power control circuitry, wherein the power control circuitry is connected to the power input to receive power therefrom, wherein the power control circuitry is connected to the energy storage element to supply power thereto and receive power therefrom, wherein the power control circuitry is configured to connect to functional circuitry of the luminaire to provide power thereto, wherein the functional circuitry of the luminaire is configured to perform a task having a higher power demand than the power supplied by the power source, and wherein the power control circuitry is configured to, in response to the higher power demand for the functional circuitry to perform the task, cause power to be supplied from the energy storage element to the functional circuitry of the luminaire to satisfy the higher power demand; and a driver configured for driving the light source, wherein the driver comprises driver circuitry configured for converting grid power into a light source power signal suitable for driving the light source, and wherein the driver comprises converter circuitry for converting the grid power into an auxiliary power signal of an auxiliary power supply of the power source.

20. A luminaire comprising a light source;

a luminaire control device comprising:

a power input configured to connect to a power source, wherein the power source supplies power that is less than the power needed for driving the light source;

an energy storage element; and a power control circuitry, wherein the power control circuitry is connected to the power input to receive power therefrom, wherein the power control circuitry is connected to the energy storage element to supply power thereto and receive power therefrom, wherein the power control circuitry is configured to connect to functional circuitry of the luminaire to provide power thereto, wherein the functional circuitry of the luminaire is configured to perform a task having a higher power demand than the power supplied by the power source, and wherein the power control circuitry is configured to, in response to the higher power demand for the functional circuitry to perform the task, cause power to be supplied from the energy storage element to the functional circuitry of the luminaire to satisfy the higher power demand; and a housing, wherein the light source is arranged in the housing, wherein the housing is provided with a receptacle, wherein a pluggable module is arranged outside the housing and plugged in the receptacle, and wherein the luminaire control device and/or the functional circuitry are arranged inside the housing.

* * * * *